United States Patent
Mann et al.

(10) Patent No.: US 6,901,939 B2
(45) Date of Patent: Jun. 7, 2005

(54) MOBILE ENROBER CLEANING APPARATUS

(75) Inventors: Douglas Scott Mann, Belvidere, NJ (US); Ralph David Lee, Hampton, NJ (US)

(73) Assignee: Mars Incorporated, Mc Lean, VA (US)

( * ) Notice: Subject to any disclaimer, the term of this patent is extended or adjusted under 35 U.S.C. 154(b) by 0 days.

(21) Appl. No.: 10/300,523

(22) Filed: Nov. 21, 2002

(65) Prior Publication Data

US 2004/0099286 A1 May 27, 2004

(51) Int. Cl.$^7$ ................................................. B08B 7/04
(52) U.S. Cl. ................ 134/111; 134/104.1; 134/169 R; 134/187
(58) Field of Search ............................. 134/111, 104.1, 134/166 R, 169 R, 187, 190; 118/323

(56) References Cited

U.S. PATENT DOCUMENTS

| | | | | |
|---|---|---|---|---|
| 3,103,937 A | * | 9/1963 | Foley | 134/111 |
| 3,792,801 A | * | 2/1974 | Baker et al. | 222/146.5 |
| 4,059,047 A | | 11/1977 | Sollich | 99/455 |
| 4,196,019 A | * | 4/1980 | Kohler et al. | 134/104.3 |
| 4,800,906 A | * | 1/1989 | Brightbill et al. | 134/56 R |
| 4,859,483 A | | 8/1989 | Sollich | 426/519 |
| 4,892,033 A | | 1/1990 | Sollich | 99/455 |
| 5,437,723 A | | 8/1995 | Sollich | 118/21 |
| 6,306,221 B1 | * | 10/2001 | Magliocca | 134/10 |
| 6,348,105 B1 | | 2/2002 | Heyde et al. | 134/19 |

* cited by examiner

Primary Examiner—Michael Barr
Assistant Examiner—Saeed Chaudhry
(74) Attorney, Agent, or Firm—Fitzpatrick, Cella, Harper & Scinto

(57) ABSTRACT

An apparatus for cleaning an enrober head and a method for using the apparatus, in which the apparatus has a cleaning medium supply vessel having an outlet and an open top, an enrober head mount registered with the open top of the vessel, and a pump, arranged to pump cleaning medium from the vessel to an applicator for application to enrober head elements requiring cleaning. The mount is adapted to attach an enrober head to the vessel, such that, when an enrober head is removed from an enrober and mounted on the apparatus, cleaning medium applied to elements of the enrober head can pass through those elements, through the mount and open top, and back into the vessel, cleaning the enrober head elements, and allowing the cleaning medium to be reapplied.

12 Claims, 3 Drawing Sheets

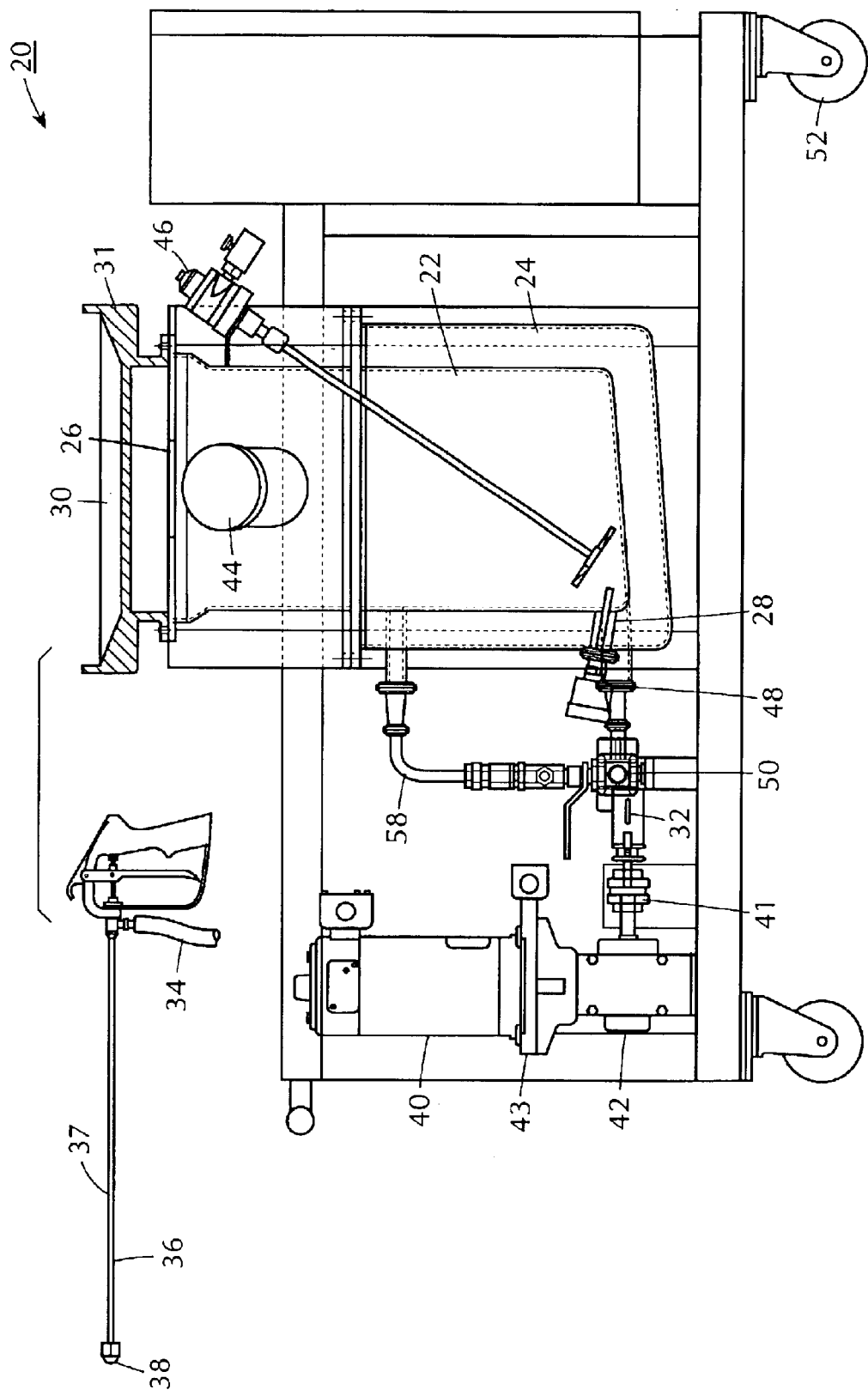

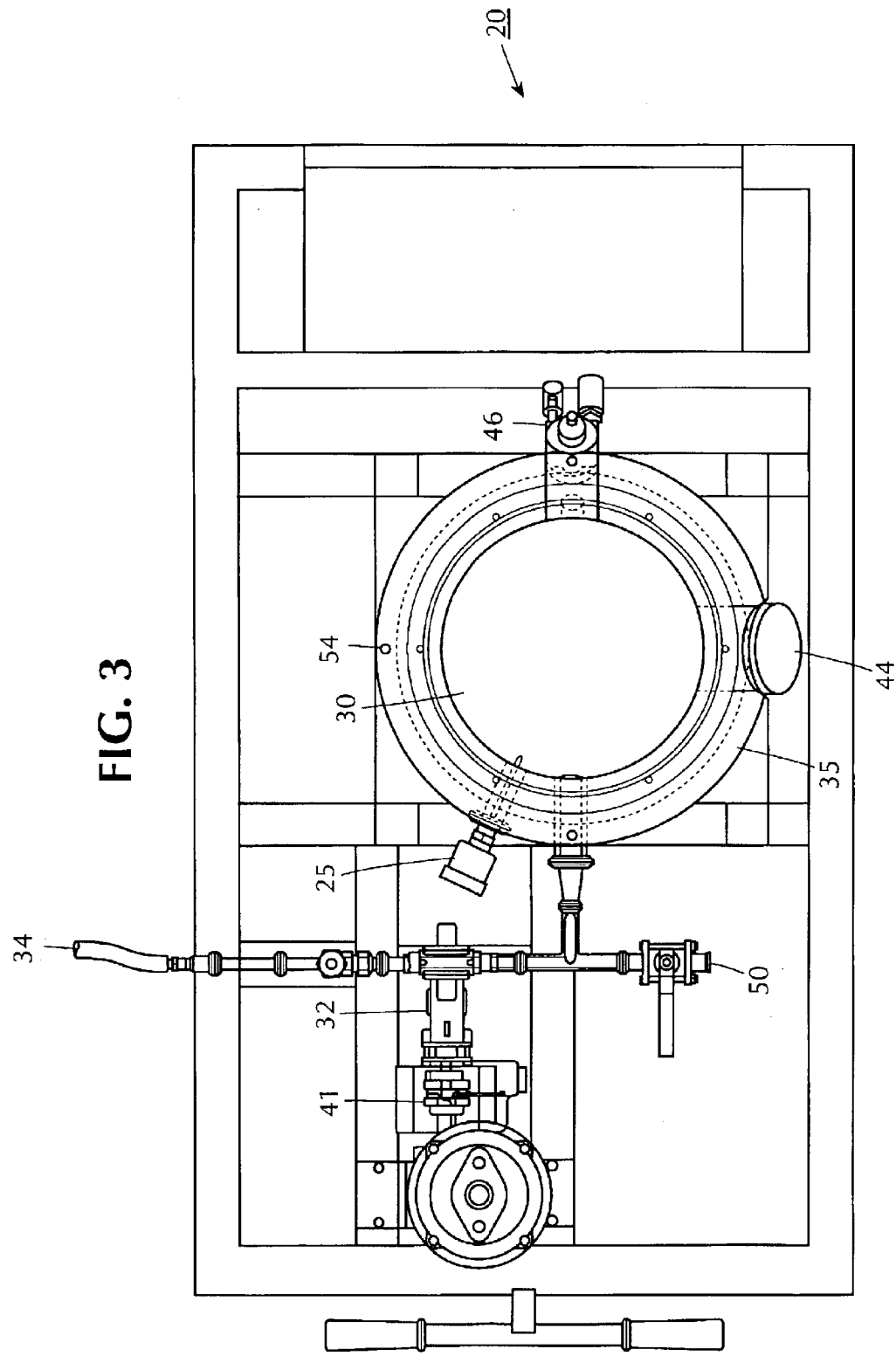

MOBILE ENROBER CLEANING APPARATUS

BACKGROUND OF THE INVENTION

1. Field of the Invention

The present invention generally relates to an apparatus for cleaning enrober heads used for coating articles with chocolate or other similar masses. In particular, the present invention relates to an apparatus for cleaning an enrober head without removing the chocolate or other similar mass from the base of the enrober.

2. Related Background Art

A coating or enrobing apparatus, that is, an enrober, is typically used to coat articles with a coating mass, such as chocolate, frosting, caramel, and other coating masses having similar rheological properties. A typical enrober comprises a continuous, driven grating conveyor belt that transports articles to be coated through the enrober, a coating station from which a coating mass is deposited onto articles on the grating belt, a drive mechanism for the belt, a heated tub positioned under the grating belt in the base of the enrober, a pump mechanism for pumping a heated coating mass from the tub to the coating station, and a blower to blow off any excess coating mass from coated articles. During the coating or enrobing process, a coating mass is released from the coating station, and falls freely onto articles on the belt. Any excess coating mass falls into the heated tub after passing through the grating belt and through or over other parts of the enrober mechanism. As a result, most of the elements of the enrober usually become coated with the coating mass.

When a coating mass in the enrober is changed to one of a different type, any of the first coating mass on any of the elements of the enrober mechanism must be removed to prevent contamination of the new and different coating mass. This removal process is typically accomplished by heating the enrober, and pumping out any coating mass remaining in the tub. Once the remains of the first coating mass are removed from the enrober, those elements of the enrober that were in contact with the coating mass must be cleaned.

Mechanical removal, such as with special cleaning tools, is difficult and time consuming, requiring access to every element of the enrober that contacts the coating mass. As a result, a second cleaning step is often required, in which hot water or a fatty material, such as cocoa butter or an edible oil, is used as a cleaning medium. When a fatty material is used in such a second cleaning step, the cleaning medium is first introduced into the tub of the emptied enrober, and the enrober is then operated without any articles on the belt, so that the cleaning medium is continuously circulated through the mechanism. As the cleaning medium follows the path of a coating mass through the enrober, it contacts all elements contacted by the old coating mass. As a result, the remaining old coating mass is melted off those elements. The cleaning medium is then removed, and the enrober is refilled with a fresh coating mass.

Where hot water is used, it is typically sprayed under high pressure onto all of the elements of the enrober, so that the temperature and pressure of the water removes any coating mass contacted by the water. As this method is basically mechanical, only those elements of the enrober directly accessible to the pressurized water can be properly cleaned. Moreover, the temperature of the pressurized water decreases rapidly when sprayed. As a result, elements of the enrober may not be sufficiently heated, so that little or no melting of the coating mass occurs on those elements not directly accessible to the sprayed water. Also, due to the high velocity of the pressurized water spray, material washed from accessible elements is often deposited onto less accessible elements in the enrober.

Certain attempts have been made to remedy these drawbacks in prior apparatus. For example, U.S. Pat. No. 5,437,723 to Sollich discloses a coating apparatus, comprising a grating belt having upper and lower runs and a tensioning device for the belt. The tensioning device has a relaxed position, which allows the upper run of the belt to be lifted away, thereby providing improved access to other elements of the apparatus for cleaning.

U.S. Pat. No. 6,348,105 to Heyde et al. discloses a method for cleaning chocolate from a coating apparatus with hot water. The method comprises filling the tub of the coating apparatus with hot water, pumping the water out of the tub with at least one pump, and directing the water, which is not pressurized, over the belt and elements of the coating apparatus. Using the tub, the water is maintained at a temperature higher than the melting temperature of the coating mass to be cleaned from the elements of the coating apparatus.

Known prior art methods for cleaning enrobers require emptying the enrober tub to clean the enrober head. Therefore, a need still exists for a method and apparatus for cleaning enrober heads that eliminate the need to empty the enrober tub. The present invention provides such a method and apparatus.

SUMMARY

The present invention provides an advance over known methods and systems by utilizing the removability of the enrober head from the enrober tub and its contents to allow the head to be cleaned independently. Using the apparatus of the invention, the enrober tub and its contents are not disturbed when the head is cleaned, thereby improving the efficiency of the head cleaning process. That is, with the present invention, emptying the tub to clean the head is not required. Moreover, a single enrober head may be used with multiple different enrober tubs, each having different contents that are not disturbed for head cleaning.

The present invention is directed to an apparatus and a method for cleaning an enrober head. The method of the invention comprises removing an enrober head from an enrober apparatus, mounting the enrober head on an enrober head cleaning apparatus, comprising a cleaning medium supply, pumping cleaning medium, such as from the cleaning medium supply to a cleaning medium applicator, applying cleaning medium to elements of the enrober head requiring cleaning, and allowing the cleaning medium to pass through the enrober head and back into the cleaning medium supply. Preferably, the method further comprises circulating the cleaning medium through a heated kettle in the enrober head cleaning apparatus, and reapplying the cleaning medium. In addition, the cleaning medium preferably cascades from through and over the elements of the enrober head as it pass through the head.

The apparatus of the invention comprises a mount configured to receive and carry an enrober head, where the mount defines an aperture, a cleaning medium supply vessel having an outlet and an open top, the open top in fluid communication with the mount aperture, and a pump in fluid communication with the vessel outlet and a cleaning medium applicator. The pump is configured to pump cleaning medium from the vessel to the applicator for application of the cleaning medium to the enrober head, where, when cleaning medium is pumped from the cleaning medium supply vessel to the applicator, and applied to the enrober head, the cleaning medium passes through the enrober head back into the cleaning medium supply vessel. Preferably, the enrober head cleaner of the invention is mobile, such that the cleaner may be used to clean more than one enrober head.

BRIEF DESCRIPTION OF THE DRAWINGS

FIG. 2 is a side view of an enrober head cleaning apparatus of the invention; and FIG. 3 is a top view of the enrober head cleaning apparatus of FIG. 2.

DETAILED DESCRIPTION OF THE INVENTION

Figure 1:
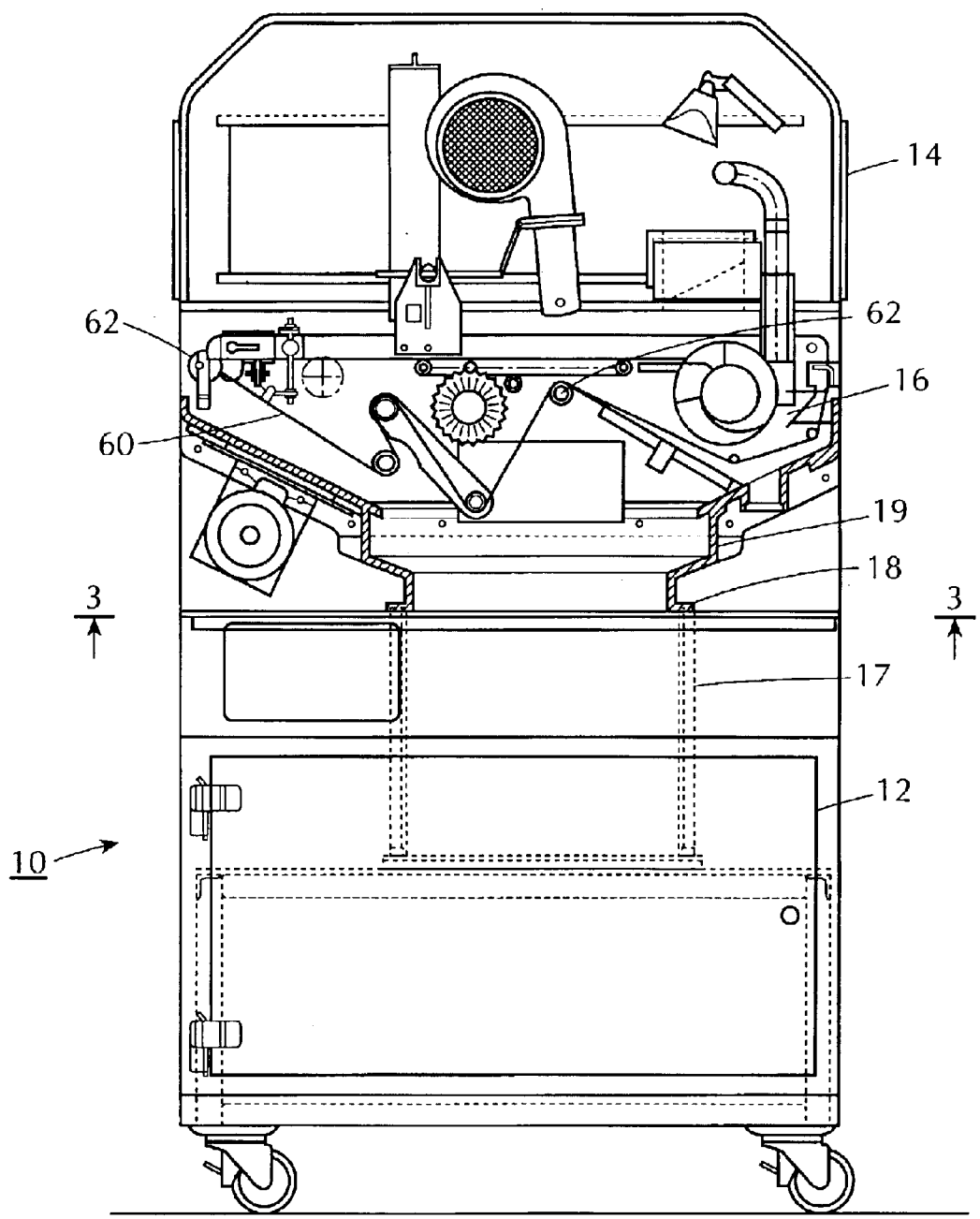
FIG. 1 is an illustration of an enrober having a separable head that may be cleaned with the present invention.

The present invention is described herein as an apparatus and method for cleaning a coating mass, such as chocolate, from the elements of an enrober head. However, as will be recognized by those of ordinary skill in the art, the present invention may be used for cleaning materials other than chocolate that can be applied using an enrober head from the enrober, such as compound coating, frosting, and caramel. Therefore, as used herein, any use of the term "coating mass" is intended to include any coating mass having rheological properties similar to chocolate, frosting, compound coating, and caramel, such that the mass can be applied with an enrober.

The present invention is directed to an enrober head cleaning apparatus for cleaning enrober heads that are separable from an enrober base. A typical enrober, having a separable head, such as those available from Sollich GmbH, Bad Salzuften, Germany, is illustrated in FIG. 1. A typical enrober 10 comprises a base 12 and a head 14. The base 12 typically comprises a heated tub 17 for the coating mass. The head 14 generally includes elements 16 of the enrober 10 that are contacted by a coating mass during an enrobing process, and, thus, must be cleaned when one coating mass in the enrober is changed to a different coating mass. The enrober elements 16 include, but are not limited to, a grating conveyor belt 60, pulleys 62 for guiding and driving the belt, and an associated belt-driving mechanism. The enrober head 14 may be detached from the enrober base 12 by releasing or removing an enrober head securing mechanism 18, which secures the enrober head base 19 to the enrober base 12. This allows a separate base 12 and tub 17 to be used for each different type of coating mass, so that only the enrober head need be cleaned when the coating mass used in the enrober is changed.

An enrober head cleaning apparatus 20 in accordance with the invention is illustrated in side and top views in FIGS. 2 and 3, respectfully. This apparatus 20 comprises a cleaning medium vessel 22, such as a kettle, having a top opening 26 and an outlet 28, and is preferably heated and, more preferably insulated. The vessel 22 may be in functional thermal communication with a heater 24, or may comprise a heater that is integral with the vessel 22. The heater 24 may be of any type known in the art, such as an electrical heater, including heating blankets and heating tapes, or a device for providing a hot fluid, such as steam or water, to or around the vessel 22. The temperature of the vessel 22 and its contents are preferably monitored by a sanitary Resistance Thermal Device ("RTD") or a thermocouple 25. The cleaning medium used in the apparatus 20 is preferably a fatty material, such as cocoa butter, vegetable oil, and mixtures thereof. An enrober head mount 31 is secured to the top of the vessel 22, such that the vessel top opening 26 is registered with an aperture 30 in the enrober head mount 31. Therefore, cleaning medium and any accompanying coating mass that passes from the head 14 through the aperture 30 also passes through the top opening 26 into the vessel 22 when a head 14 and apparatus 20 are assembled together, and the head the 14 is cleaned.

The vessel outlet 28 is connected to a pump 32. The pump is preferably driven by a pump drive 40, such as an electric motor, to force cleaning medium from the vessel 22 through a conduit 34, such as pipe or tubing, to a cleaning medium applicator 36. The conduit 34 is preferably heated and, more preferably, at least in part, flexible. The applicator 36 may be a spray gun having a wand 37, a nozzle 38, and, preferably, an applicator control 39, as illustrated in FIG. 2. The applicator control 39 allows an operator to control the flow of cleaning medium pumped from the vessel. It is desirable to allow the pump drive 40 and, thus, the pump 32 to run continuously. Therefore, the apparatus 20 preferably further comprises a cleaning medium return line 58 that returns cleaning medium to the vessel 22 from the pump 32 when the applicator 36 is not operated, and the pump 32 is running. This configuration prevents excessive pressure from developing in the conduit 34 and in the pump 32, and reduces unnecessary strain on the pump drive 40. The cleaning medium return line 58 may also be used to return excess cleaning medium to the vessel 22 when only a partial flow of the medium is required or the pressure within the conduit 34 and/or the applicator 36 exceeds a preset value.

The pump drive 40 may be connected to the pump 32 through a flexible coupling 41 to reduce vibration and a reducer 42, such as a reduction gear box, to reduce the rotational speed of the pump drive to the level required for the pump. Depending on the pump, pump drive reductions of about 2:1 to about 10:1 may be appropriate. A prototype of an apparatus in accordance with the invention using a 0.33 horsepower, 1800 RPM motor with a 5:1 reducer has been built. As will be recognized by those of ordinary skill in the art, the pump drive 40 must have a power output sufficient to drive the pump 32 so it can feed a viscous cleaning medium, such as cocoa butter through the apparatus 20. Preferably, the pump drive 40 should have a power output of from about 0.25 to about 1 horsepower. A tachometer sender 43 may be mounted with the pump drive 40 to monitor pump drive speed, and is preferably positioned between the pump drive 40 and the reducer 42.

In addition, the apparatus 20 may further comprise a filling chute 44 for introducing cleaning medium into the vessel 22, an agitator 46, which may powered by any means known in the art, such as an electric motor or compressed air, for agitating, stirring or mixing the medium within the vessel 22, a screen 48, which may be removable or permanently mounted, for removing particulates from circulated cleaning medium, preferably before it reaches the pump, and a drain 50 for draining cleaning medium from the vessel 22. The apparatus 20 may also be mobile, having wheels or casters 52 to allow it to be moved from one enrober to another.

The mount 31 is preferably configured to have a shape that corresponds to the shape of the enrober head base 19, such that the weight of the enrober head 14 can securely position and hold the head 14 on the mount 31. The mount 31 may have a plurality of mounting points 54 that correspond to the head securing mechanism 18 attachment points on the enrober head base 19. In this way, the head base 19 may be securely mounted on the mount 31. The mounting points and attachment points may be any attachment devices known in the art, such as threaded fasteners, keys, locking pins, latches, or clamps. The mounting points 54 on the mount 31 are complimentary to the head securing mechanism 18 attachment points on the enrober head base 19.

An enrober head may be cleaned using the enrober head cleaner 20, such as that described above, as follows. Cleaning medium is introduced into the vessel 22 through the filling chute 44 to fill the vessel 22. An enrober head 14 is removed from an enrober base 12, and securely positioned on the mount 31. The pump drive 40 is turned on to drive the pump 32, thereby pumping cleaning medium through the screen 48 and conduit 34 to the applicator 36. When the applicator 36 is not being operated, the cleaning medium is returned to the vessel 22 through the return line 58. When the applicator 36 is operated, cleaning medium is applied, preferably by spraying, onto those elements 36 of the cleaning head 14 that require cleaning, and passes through and over those elements 36, through the aperture 30 in the mount 31, and into the vessel 22. Any excess cleaning medium not dispensed through the applicator 36 is returned to the vessel 22 through the return line 58. If necessary, used cleaning medium may be removed from the vessel 22 through the drain 50, and fresh cleaning medium introduced through the filling chute 44. During the cleaning process, the cleaning medium is preferably mixed by the agitator 46, and heated with the heater 24 to a temperature sufficient to melt the coating mass from the elements 16. That temperature is preferably from about 40° to about 60° C. The temperature may be monitored and controlled using any temperature measuring device known in the art, such as thermocouple 25. Once the enrober head 14 has been cleaned, it is removed from the apparatus 20, and may again be attached to an enrober base 12 for coating articles with the coating mass in the tub 17 of the base 12. The enrober base 12 may be the same base previously used with the enrober head 14 or a different base containing a coating mass that may the same as or different from the coating medium in the first base.

Accordingly, it will be appreciated that the present invention provides a convenient and efficient method and apparatus for cleaning the components of an enrober head. This invention is not limited by the embodiments disclosed herein and it will be appreciated that numerous modifications and embodiments may be devised by those skilled in the art. Therefore, it is intended that the appended claims cover all such modifications and embodiments that fall within the true spirit and scope of the present invention.

What is claimed is:

1. An enrober head cleaning apparatus and enrober head, comprising:

i) the enrober head cleaning apparatus having a mount configured and adapted to mount an enrober head, the mount defining a mount aperture;

a cleaning medium supply vessel having an outlet and an open top, the open top in fluid communication with the mount aperture;

a pump in fluid communication with the vessel outlet; and a cleaning medium applicator;

the pump arranged to pump cleaning medium from the vessel to the applicator for application of the cleaning medium to the enrober head; and ii) an enrober head having an enrober aperture, the enrober head mounted on the enrober head cleaning apparatus so that the mount aperture is registered with the enrober aperture; wherein, when the pump is activated, and cleaning medium is applied to the enrober head, the cleaning medium passes through the enrober head into the cleaning medium supply vessel.

2. The apparatus of claim 1, further comprising an agitator, configured to agitate cleaning medium within the vessel.

3. The apparatus of claim 2, wherein the agitator is one of an air-powered or electric-powered mixer.

4. The apparatus of claim 1, wherein the vessel is in functional thermal communication with a heater for heating the heating medium contained therein.

5. The apparatus of claim 4, wherein the heater is configured to maintain cleaning medium in the vessel at a temperature of from about 40° C. to about 60° C.

6. The apparatus of claim 1, wherein the vessel comprises a heated kettle.

7. The apparatus of claim 1, further comprising a heated conduit connecting the pump to the cleaning medium applicator.

8. The apparatus of claim 1, further comprising a screen positioned to screen the cleaning medium before application of the cleaning medium to the enrober head.

9. The apparatus of claim 8, wherein the screen is positioned between the vessel outlet and the pump.

10. The apparatus of claim 1, wherein the cleaning medium applicator comprises a spray gun.

11. The apparatus of claim 10, wherein the a spray gun comprises a wand/nozzle assembly.

12. The apparatus of claim 1, further comprising a securing mechanism configured to secure the enrober head to the enrober head cleaning apparatus.

* * * * *